United States Patent
Kim et al.

(10) Patent No.: US 12,415,404 B2
(45) Date of Patent: Sep. 16, 2025

(54) VEHICULAR AIR CONDITIONING SYSTEM

(71) Applicant: Hanon Systems, Daejeon (KR)

(72) Inventors: Hak Kyu Kim, Daejeon (KR); In Hyeok Kim, Daejeon (KR); Sang Jun Yoo, Daejeon (KR); Hong Rae Jung, Daejeon (KR)

(73) Assignee: HANON SYSTEMS, Daejeon (KR)

(*) Notice: Subject to any disclaimer, the term of this patent is extended or adjusted under 35 U.S.C. 154(b) by 0 days.

(21) Appl. No.: 18/569,954

(22) PCT Filed: Sep. 23, 2022

(86) PCT No.: PCT/KR2022/014268
§ 371 (c)(1),
(2) Date: Dec. 13, 2023

(87) PCT Pub. No.: WO2023/058971
PCT Pub. Date: Apr. 13, 2023

(65) Prior Publication Data
US 2024/0278622 A1    Aug. 22, 2024

(30) Foreign Application Priority Data

Oct. 6, 2021  (KR) .................. 10-2021-0132460
Aug. 26, 2022 (KR) .................. 10-2022-0107316

(51) Int. Cl.
*B60H 1/32*    (2006.01)

(52) U.S. Cl.
CPC ......... *B60H 1/3216* (2013.01); *B60H 1/3222* (2013.01)

(58) Field of Classification Search
CPC .......... F25B 2600/021; F25B 2600/025; F25B 2700/21154; F25B 2700/2117;
(Continued)

(56) References Cited

U.S. PATENT DOCUMENTS

| | | | |
|---|---|---|---|
| 8,459,053 B2 * | 6/2013 | Pham ................ | F04C 28/28 62/208 |
| 2002/0108384 A1 * | 8/2002 | Higashiyama ....... | B60H 1/3222 62/183 |

(Continued)

FOREIGN PATENT DOCUMENTS

| KR | 20100027573 A | 3/2010 |
|---|---|---|
| KR | 20110098315 A | 9/2011 |

(Continued)

OTHER PUBLICATIONS

International Search Report issued in PCT/KR2022/014268 on Jan. 13, 2023.

*Primary Examiner* — Marc E Norman
(74) *Attorney, Agent, or Firm* — NORTON ROSE FULBRIGHT US LLP

(57) ABSTRACT

The present invention relates to a vehicular air conditioning system and provides a vehicular air conditioning system capable of preventing overheating of an inverter that controls the rotation speed of an electric compressor without cutting off the inverter, and consequently preventing the stoppage of an air conditioner due to the cut-off of the inverter and the resultant stoppage of cooling of a passenger room. The vehicular air conditioning system includes an electric compressor, an inverter configured to control a rotation speed of the electric compressor, and a control part configured to execute control so that a refrigerant flow rate on an inlet side of the electric compressor increases when a temperature of the inverter is equal to or higher than a preset overheating warning temperature.

10 Claims, 3 Drawing Sheets

(58) Field of Classification Search
CPC .... F25B 49/025; F25B 49/005; B60H 1/3216; B60H 1/3222
See application file for complete search history.

(56) References Cited

U.S. PATENT DOCUMENTS

2005/0210897 A1* 9/2005 Oomura ................ F25B 49/005
 62/239
2016/0134226 A1 5/2016 Najima

FOREIGN PATENT DOCUMENTS

| KR | 20120061467 A | 6/2012 |
| KR | 20120095735 A | 8/2012 |
| KR | 20120110858 A | 10/2012 |

* cited by examiner

PRIOR ART

VEHICULAR AIR CONDITIONING SYSTEM

CROSS REFERENCE TO RELATED APPLICATIONS

This patent application is a national phase under 35 U.S.C. § 371 of International Patent Application No. PCT/KR2022/014268 filed Sep. 23, 2022, which claims the benefit of priority from Korean Patent Application Nos. 10-2021-0132460 filed Oct. 6 2021, and 10-2022-0107316 filed Aug. 26, 2022, each of which is hereby incorporated herein by reference in its entirety for all purposes.

TECHNICAL FIELD

The present invention relates to a vehicular air conditioning system, and more particularly, a vehicular air conditioning system capable of preventing overheating of an inverter that controls the rotation speed of an electric compressor without cutting off the inverter, and consequently preventing the stoppage of an air conditioner due to the cut-off of the inverter and the resultant stoppage of cooling of a passenger room.

BACKGROUND ART

In a hybrid vehicle and an electric vehicle (hereinafter collectively referred to as "vehicle"), all devices in the vehicle use electricity as a power source. In particular, an air conditioning system for adjusting the temperature inside the vehicle also uses electricity as a power source.

As shown in FIG. 1, such an electrically-powered air conditioning system is equipped with an electric compressor 10 for compressing a refrigerant to a high temperature and high pressure state.

The electric compressor 10 includes a compression part 12 for compressing a refrigerant, and a motor part 14 for driving the compression part 12.

In this electric compressor 10, when the motor part 14 is operated by the electricity applied thereto, the compression part 12 is driven. When the compression part 12 is driven, the refrigerant on the evaporator 20 side is introduced into an inlet 16 and is compressed to a high temperature and high pressure by the compression part 12.

The compressed high-temperature high-pressure refrigerant is discharged toward the condenser 22 through the discharge port 18.

Meanwhile, the rotation speed of the electric compressor 10 is adjusted by an inverter 30, and the electric compressor 10 having the adjusted rotation speed adjusts the flow rate of the refrigerant flowing toward a condenser 22, an expansion valve 24, and an evaporator 20.

The inverter 30 includes an inverter housing 32, a circuit board 34 built into the inverter housing 32, and a plurality of circuit elements 36 installed on the circuit board 34.

The inverter 30 applies or cuts off electric power supplied to the motor part 14 and controls the rotation speed of the motor part 14.

In particular, when an evaporator target temperature is set according to the cooling and heating load in the passenger room, i.e., the temperature conditions inside and outside the passenger room and the user-set temperature, the rotation speed of the motor part 14 is controlled in accordance with the set evaporator target temperature.

Therefore, the electric compressor 10 can discharge an optimal amount of refrigerant suitable for the evaporator target temperature. As a result, the temperature of the evaporator 20 can be controlled to match the evaporator target temperature.

Meanwhile, the inverter 30 generates heat during the control process of the electric compressor 10. In particular, among the circuit elements 36 built into the inverter 30, an IGBT (Insulated Gate Bipolar Transistor) element generates heat at a high temperature. This heat generation may cause the inverter 30 to be overheated and subjected to damage or failure.

As a solution to the overheating of the inverter 30, there is known a cooling technique that makes use of a refrigerant at the inlet 16 of the electric compressor 10.

In this technique, the inverter 30 is integrally installed on the side of the refrigerant inlet 16 of the electric compressor 10, so that the relatively low temperature refrigerant sucked into the refrigerant inlet 16 of the electric compressor 10 indirectly contacts the inverter 30.

Therefore, heat exchange can occur between the low-temperature refrigerant at the inlet 16 and the inverter 30, thereby cooling inverter 30.

However, the conventional air conditioning device has a disadvantage that the cooling efficiency of the inverter 30 is reduced when the flow rate of the refrigerant sucked into the inlet 16 of the electric compressor 10 is low. Therefore, the inverter 30 is highly likely to be overheated.

In consideration of this, there is available a technique for preventing the overheating of the inverter 30.

This technology fundamentally prevents the overheating of the inverter 30 by cutting off the inverter 30 when the temperature of the inverter 30 is equal to or higher than a preset overheating reference temperature. Therefore, damage and failure of the inverter 30 due to the overheating are prevented.

The technique for cutting off the inverter 30 is configured to cut off the inverter 30 whenever the inverter 30 is overheated. Therefore, the air conditioning system is stopped whenever the inverter 30 is overheated. Therefore, the cooling and heating in the passenger room are stopped.

In particular, the overheating of the inverter 30 may frequently occur in the summer when the temperature is high. This may frequently stop the air conditioning system, thereby significantly reducing the comfort in the passenger room.

SUMMARY

In view of the problems inherent in the related art, it is an object of the present invention to provide a vehicular air conditioning system capable of preventing the overheating of an inverter without cutting off the inverter.

Another object of the present invention is to provide a vehicular air conditioning system capable of preventing the stoppage of an air conditioner due to the cut-off of an inverter and the resultant stoppage of cooling of a passenger room.

A further object of the present invention is to provide a vehicular air conditioning system capable of significantly improving the comfort in a passenger room.

In order to achieve these objects, there is provided a vehicular air conditioning system, including: an electric compressor; an inverter configured to control a rotation speed of the electric compressor; and a control part configured to execute control so that a refrigerant flow rate on an inlet side of the electric compressor increases when a temperature of the inverter is equal to or higher than a preset overheating warning temperature.

The control part may be configured to execute control so that when the temperature of the inverter is equal to or higher than the overheating warning temperature, an evaporator target temperature is variably adjusted according to the temperature of the inverter to variably adjust the rotation speed of the electric compressor.

The inverter may be installed on the inlet side of the electric compressor and cooled by an inlet side refrigerant, and the control part may be configured to control the rotation speed of the electric compressor according to the temperature of the inverter so that the refrigerant flow rate on the inlet side of the electric compressor for cooling the inverter is variably adjusted depending on the temperature of the inverter.

As the temperature of the inverter increases toward an overheating reference temperature set higher than the overheating warning temperature, the control part may gradually lower the evaporator target temperature in inverse proportion thereto, and as the temperature of the inverter approaches the overheating reference temperature from the overheating warning temperature, the control part may execute control to gradually increase the rotation speed of the electric compressor so that the refrigerant flow rate on the inlet side of the electric compressor gradually increases as the temperature of the inverter approaches the overheating reference temperature.

The control part may store table values of evaporator target temperature drop amounts for respective inverter temperatures, and when the temperature of the inverter increases toward the overheating reference temperature, the control part may variably adjust the evaporator target temperature according to the temperature of the inverter based on the table values of evaporator target temperature drop amounts for respective inverter temperatures.

When the temperature of the inverter increases toward the overheating reference temperature, the control part may detect an evaporator target temperature drop amount corresponding to the temperature of the inverter from the table values of evaporator target temperature drop amounts for respective inverter temperatures, and the control part may be configured to calculate a final evaporator target temperature (T3) by processing a detected evaporator target temperature drop amount (T2) and an evaporator target temperature (T1) preset according to temperature conditions inside and outside a passenger room and a user-set temperature by equation (1) below, and change the calculated final evaporator target temperature (T3) to the evaporator target temperature: final evaporator target temperature (T3)=preset evaporator target temperature (T1)−evaporator target temperature drop amount (T2) corresponding to inverter temperature . . . (1).

According to the vehicular air conditioning system of the present invention, as the temperature of the inverter approaches the overheating reference temperature, the evaporator target temperature is gradually lowered to gradually increase the refrigerant discharge amount of the electric compressor. Therefore, as the temperature of the inverter approaches the overheating reference temperature, it is possible to increase the refrigerant flow rate on the inlet side of the electric compressor and to gradually increase the cooling efficiency of the inverter through the increase in the refrigerant flow rate on the inlet side.

Further, since the cooling efficiency of the inverter can be gradually increased by increasing the refrigerant flow rate on the inlet side of the electric compressor, unlike the prior art, the overheating of the inverter can be prevented without cutting off the inverter.

In addition, since the overheating of the inverter can be prevented without cutting off the inverter, it is possible to prevent the stoppage of the air conditioner due to the cut-off of the inverter and the resultant stoppage of cooling of the passenger room, thereby significantly improving the comfort in the passenger room.

DETAILED DESCRIPTION

Figure 1:
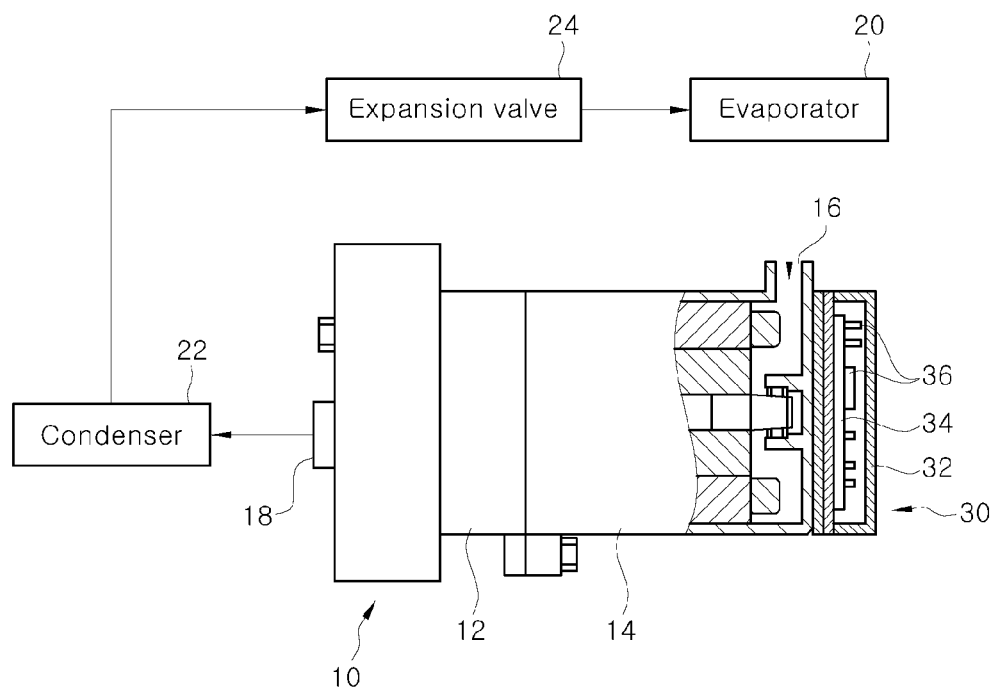
FIG. 1 is a diagram schematically showing a conventional vehicular air conditioning system.

A preferred embodiment of a vehicular air conditioning system according to the present invention will now be described in detail with reference to the accompanying drawings.

Prior to describing features of the vehicular air conditioning system according to the present invention, an electric compressor of a vehicular air conditioning system will be described briefly with reference to FIG. 2.

The electric compressor 10 includes a compression part 12 and a motor part 14. When the compression part 12 is driven by the motor part 14, the refrigerant on the evaporator 20 side is introduced into an inlet 16 and is compressed to a high temperature and high. The compressed high-temperature high-pressure refrigerant is discharged toward a condenser 22 through a discharge port 18.

The rotation speed of the electric compressor 10 is adjusted by an inverter 30, and the electric compressor 10 having the adjusted rotation speed adjusts the flow rate of the refrigerant flowing toward a condenser 22, an expansion valve 24, and an evaporator 20.

The inverter 30 includes an inverter housing 32, a circuit board 34 built into the inverter housing 32, and a plurality of circuit elements 36 installed on the circuit board 34.

The inverter 30 applies or cuts off electric power supplied to the motor part 14 and controls the rotation speed of the motor part 14.

In particular, when an evaporator target temperature is set in a control part 40 according to the temperature conditions inside and outside the passenger room and the user-set temperature, the rotation speed of the motor part 14 is controlled in accordance with the set evaporator target temperature of the control part 40.

Therefore, the electric compressor 10 can discharge an optimal amount of refrigerant suitable for the evaporator target temperature. As a result, the temperature of the evaporator 20 can be controlled to match the evaporator target temperature.

In this regard, the control part 40 is equipped with a microprocessor, and may be installed integrally on the circuit board 34 within the inverter 30, or may be configured separately from the inverter 30 as the case may be.

Next, the features of the vehicular air conditioning system according to the present invention will be described in detail with reference to FIGS. 2 and 3.

Figure 2:
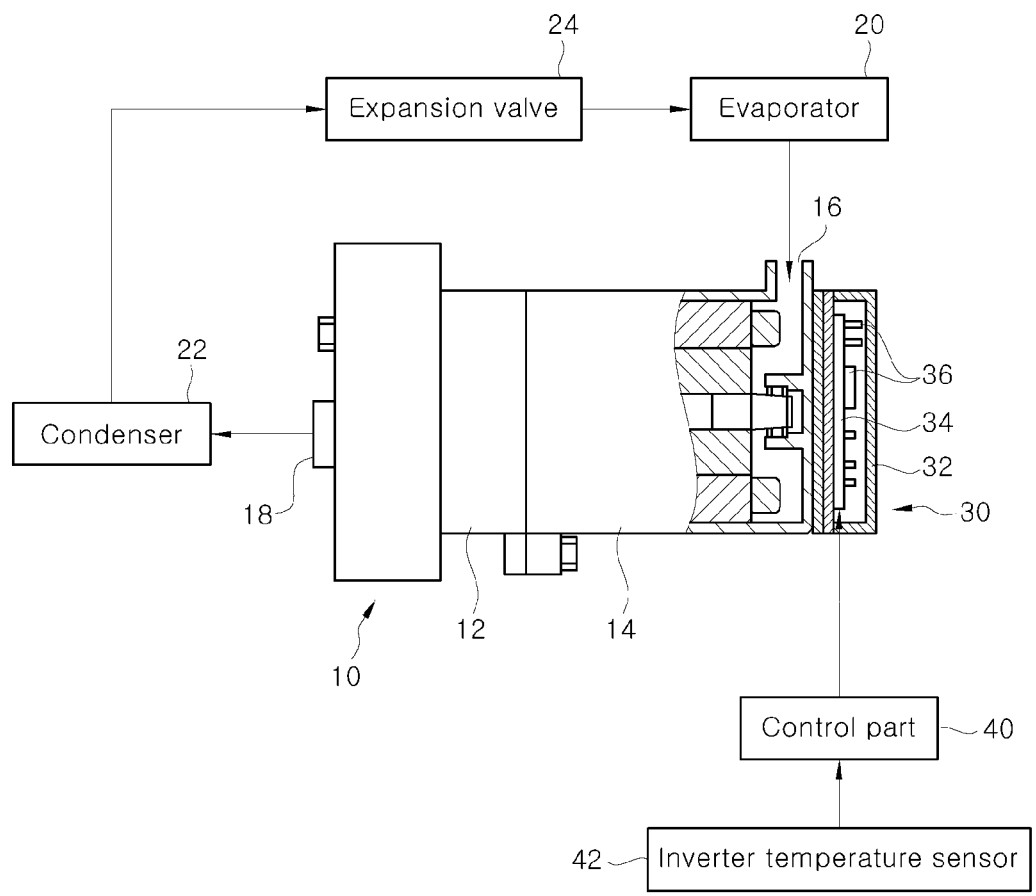
FIG. 2 is a diagram showing the configuration of a vehicular air conditioning system according to the present invention.

Referring first to FIG. 2, the air conditioning system of the present invention is provided with the control part 40. The control part 40 is configured to variably adjust the evaporator target temperature according to the sensing value of an inverter temperature sensor 42 that detects the temperature of the inverter 30.

Specifically, the control part 40 is configured to variably adjust the evaporator target temperature according to the inputted inverter temperature when temperature data of the inverter 30 is inputted from the inverter temperature sensor 42.

In particular, as the inverter temperature increases to a temperature approaching a preset overheating reference temperature, the evaporator target temperature is gradually lowered by a preset temperature in inverse proportion to the increase in the inverter temperature.

For example, if the overheating reference temperature of the inverter 30 is 120 degrees C., each time when the temperature of the inverter 30 increases toward the overheating reference temperature (120 degrees C.) by a preset temperature (2 degrees C.) from a specific overheating warning temperature (114 degrees C.) below the overheating reference temperature of 120 degrees C., the evaporator target temperature is gradually lowered by a preset temperature (1 degrees C.) in inverse proportion to the increase in the temperature of the inverter.

Therefore, when the temperature of the inverter 30 gradually increases from an overheating warning temperature to a temperature approaching the overheating reference temperature set higher than the overheating warning temperature, the inverter 30 gradually increases the rotation speed of the electric compressor 10 correspondingly.

Thus, as the temperature of the inverter 30 gradually increases from the overheating warning temperature to a temperature approaching the overheating reference temperature, the refrigerant discharge flow rate of the electric compressor 10 is gradually increased in proportion thereto.

As a result, as the temperature of the inverter 30 increases to a temperature approaching the overheating reference temperature, the amount of the refrigerant returned to the inlet 16 of the electric compressor 10 is also gradually increased in proportion thereto.

Accordingly, as the temperature of the inverter 30 increases to a temperature approaching the overheating reference temperature, the heat exchange rate between the refrigerant sucked into the inlet 16 of the electric compressor 10 and the inverter 30 increases.

Therefore, as the temperature of the inverter 30 increases to a temperature approaching the overheating reference temperature, the cooling efficiency of the inverter 30 is increased to prevent the overheating of the inverter 30.

Consequently, as the temperature of the inverter 30 approaches the overheating reference temperature, the control part 40 gradually enhances the cooling efficiency of the inverter 30 through the refrigerant on the inlet side of the electric compressor 10, thereby preventing the overheating of the inverter 30.

In particular, the overheating of the inverter 30 can be prevented without cutting off the inverter 30. Therefore, it is possible to prevent the stoppage of the air conditioner due to the cut-off of the inverter 30 and the resultant stoppage of cooling of the passenger room, thereby significantly improving the comfort in the passenger room.

Meanwhile, in some cases, the control part 40 may store target evaporator temperature drop amounts for respective inverter temperatures, as shown in Table 1 below.

The target evaporator temperature drop amounts for respective inverter temperatures are stored in the control part 40 over a range from the overheating warning temperature of the inverter 30, for example, 114 degrees C., to the overheating reference temperature or higher, for example, 126 degrees C., which is higher than 120 degrees C.

By using the stored evaporator target temperature drop amounts for respective inverter temperatures, the evaporator target temperature is varied according to the temperature of the inverter 30. Thus, the control valve of the inverter 30 for the electric compressor 10 is variably controlled according to the temperature of the inverter 30 so that the refrigerant discharge amount of the electric compressor 10 can be changed.

TABLE 1

Table values of evaporator target temperature drop amounts for respective inverter temperatures

| Inverter temperature (degrees C.) | Evaporator target temperature drop amount (degrees C.) (A < B < C < D) |
|---|---|
| 112.0 | 0.0 |
| 114.0 (Overheating warning temperature) | A |
| 116.0 | B |
| 118.0 | C |
| 120.0 (Overheating reference temperature) | D |
| 122.0 | D |
| 124.0 | D |
| 126.0 | D |

In this regard, the control part 40 may change the evaporator target temperature based on the table values of evaporator target temperature drop amounts for respective inverter temperatures only under a condition in which the temperature of the inverter 30 is equal to or higher than the preset specific overheating warning temperature set to be lower than the overheating reference temperature, for example, 120 degrees C. or lower, for example, a condition in which the temperature of the inverter 30 increases to 114 degrees C. or higher.

When changing the evaporator target temperature using the stored evaporator target temperature drop amounts for respective inverter temperatures, the control part 40 is configured to calculate a final evaporator target temperature (T3) by subtracting an evaporator target temperature drop amount (T2) corresponding to the inverter temperature from the evaporator target temperature (T1) preset according to the temperature conditions inside and outside the passenger room and the user-set temperature as in equation (1) below, and change the calculated final evaporator target temperature (T3) to the evaporator target temperature:

$$\text{final evaporator target temperature } (T3) = \text{preset evaporator target temperature } (T1) - \text{evaporator target temperature drop amount } (T2) \text{ corresponding to inverter temperature} \quad (1).$$

As a result, when the temperature of the inverter 30 increases to the overheating warning temperature or higher, the control part 40 variably set the evaporator target temperature by compensating for the evaporator target temperature drop amount corresponding to the temperature of the inverter 30 temperature to the preset evaporator target temperature.

Meanwhile, it is preferable that the evaporator target temperature drop amounts for respective inverter temperatures stored in the control part 40 increase linearly in proportion to the temperature of the inverter 30.

In particular, it is preferable that, among the evaporator target temperature drop amounts for respective inverter temperatures, the evaporator target temperature drop amount corresponding to the overheating warning temperature or higher and the overheating reference temperature or lower increases linearly in proportion to the temperature of the inverter 30.

Accordingly, as the temperature of the inverter 30 increases, the evaporator target temperature drop amount can also be gradually increased in proportion thereto. As a result, as the inverter 30 is overheated, the evaporator target temperature gradually decreases, making it possible to actively respond to the overheating of the inverter 30.

Meanwhile, among the evaporator target temperature drop amounts for respective inverter temperatures stored in the control part 40, the evaporator target temperature drop amount corresponding to the overheating reference temperature of the inverter 30 or higher is preferably maintained at a constant level.

Accordingly, the control part 40 is configured to change the evaporator target temperature based on the evaporator target temperature drop amount of the constant level when the temperature of the inverter 30 is equal to or higher than the overheating reference temperature.

The reason for adopting this configuration is that if the evaporator target temperature drop amount is made larger and the evaporator target temperature is lowered too much, an icing phenomenon may occur on the evaporator 20 side.

Referring again to FIG. 2, when the temperature of the inverter 30 is equal to or higher than the overheating warning temperature, the control part 40 may execute control to increase the minimum rotation speed (RPM) of the electric compressor 10 so that the refrigerant flow rate at the inlet 16 of the electric compressor 10 can increase.

The rotation speed of the electric compressor 10 is controlled according to the temperature of the evaporator 20. At this time, there is a minimum rotation speed reference that prevents the rotation speed of the electric compressor 10 from falling below a predetermined rotation speed.

Therefore, if the minimum rotation speed of the electric compressor 10 is increased based on this reference, the rotation speed of the electric compressor 10 increases even at the same evaporator 20 temperature. Thus, the flow rate of the refrigerant sucked at the inlet 16 of the electric compressor 10 increases to thereby improve the cooling efficiency of the inverter 30.

In some cases, when the temperature of the inverter 30 is equal to or higher than the overheating warning temperature, the control part 40 may execute control to increase the rotation speed (RPM) of the electric compressor 10 to a preset value, so that the flow rate of the refrigerant at the inlet 16 of the electric compressor 10 can increase.

Next, an operational example of the vehicular air conditioning system of the present invention having such a configuration will be described with reference to FIGS. 2 and 3.

Figure 3:
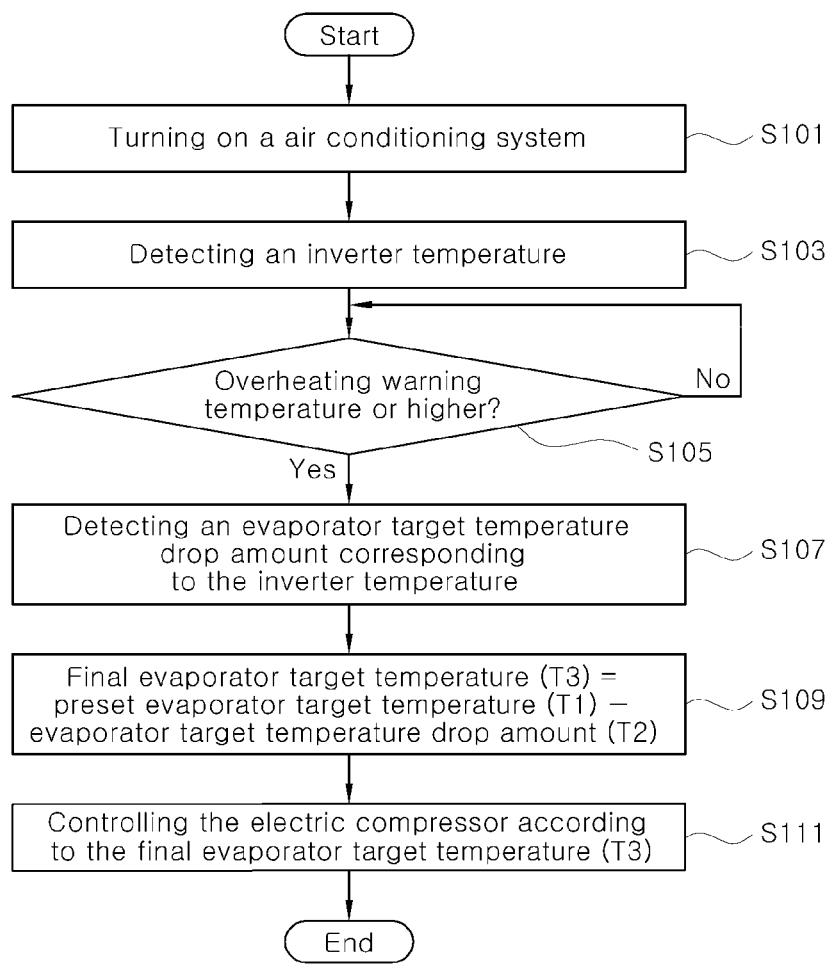
FIG. 3 is a flowchart showing an operation example of the vehicular air conditioning system according to the present invention.

Referring first to FIG. 3, when the air conditioning system is turned on (S101), the temperature of the inverter 30 is detected (S103).

When the detection of temperature of the inverter 30 is completed, the control part 40 determines whether the detected temperature of the inverter 30 is equal to or higher than a preset overheating warning temperature, for example, 114 degrees C. (S105).

As a result of the determination, if the detected temperature of the inverter 30 is equal to or higher than the preset overheating warning temperature, the control part 40 determines that there is a high risk of overheating of the inverter 30.

According to this determination, the control part 40 detects the evaporator target temperature drop amount corresponding to the current temperature of the inverter 30 from a pre-stored evaporator target temperature drop amount table as indicated in Table 1 above (S107).

When the detection of the evaporator target temperature drop amount is completed, the detected evaporator target temperature drop amount (T2) and the preset evaporator target temperature (T1) are processed using equation (1) above to calculate a final evaporator target temperature (T3) (S109).

When the calculation of the final evaporator target temperature (T3) is completed, the inverter 30 is able to control the electric compressor 10 according to the calculated final evaporator target temperature (T3) (S111).

Then, when the temperature of the inverter 30 gradually increases beyond the overheating warning temperature to the overheating reference temperature, the rotation speed of the electric compressor 10 gradually increases in response thereto.

Therefore, as the temperature of the inverter 30 gradually increases to the overheating reference temperature, the refrigerant discharge flow rate of the electric compressor 10 gradually increases in proportion thereto, so that the cooling performance of the inverter 30 through the refrigerant on the inlet side of the electric compressor 10 can gradually increases. Thus, the overheating of the inverter 30 is prevented.

According to the vehicular air conditioning system of the present invention having such a configuration, as the temperature of the inverter 30 approaches the overheating reference temperature, the evaporator target temperature is gradually lowered to gradually increase the refrigerant discharge amount of the electric compressor 10. Therefore, as the temperature of the inverter 30 approaches the overheating reference temperature, it is possible to increase the refrigerant flow rate on the inlet side of the electric compressor 10 and to gradually increase the cooling efficiency of the inverter 30 through the increase in the refrigerant flow rate on the inlet side.

Further, since the cooling efficiency of the inverter 30 can be gradually increased by increasing the refrigerant flow rate on the inlet side of the electric compressor 10, unlike the prior art, the overheating of the inverter 30 can be prevented without cutting off the inverter 30.

In addition, since the overheating of the inverter 30 can be prevented without cutting off the inverter 30, it is possible to prevent the stoppage of the air conditioner due to the cut-off of the inverter 30 and the resultant stoppage of cooling of the passenger room, thereby significantly improving the comfort in the passenger room.

While the preferred embodiments of the present invention have been described above, the present invention is not limited to the above-described embodiments. Various modifications and changes may be made without departing from the scope and spirit of the present invention defined in the claims.

What is claimed is:

1. A vehicular air conditioning system, comprising:
   an electric compressor;
   an inverter configured to control a rotation speed of the electric compressor; and
   a control part configured to execute control so that a refrigerant flow rate on an inlet side of the electric compressor increases when a temperature of the inverter is equal to or higher than a preset overheating warning temperature, wherein the control part is configured to execute control so that when the temperature of the inverter is equal to or higher than the overheating warning temperature, an evaporator target temperature is variably adjusted according to the temperature of the inverter to variably adjust the rotation speed of the electric compressor.

2. The system of claim 1, wherein the inverter is installed on the inlet side of the electric compressor and cooled by an inlet side refrigerant, and the control part is configured to control the rotation speed of the electric compressor according to the temperature of the inverter so that the refrigerant flow rate on the inlet side of the electric compressor for cooling the inverter is variably adjusted depending on the temperature of the inverter.

3. The system of claim 2, wherein as the temperature of the inverter increases toward an overheating reference temperature set higher than the overheating warning temperature, the control part gradually lowers the evaporator target temperature in inverse proportion thereto, and as the temperature of the inverter approaches the overheating reference temperature from the overheating warning temperature, the control part executes control to gradually increase the rotation speed of the electric compressor so that that the refrigerant flow rate on the inlet side of the electric compressor gradually increases as the temperature of the inverter approaches the overheating reference temperature.

4. The system of claim 3, wherein the control part stores table values of evaporator target temperature drop amounts for respective inverter temperatures, and when the temperature of the inverter increases toward the overheating reference temperature, the control part variably adjusts the evaporator target temperature according to the temperature of the inverter based on the table values of evaporator target temperature drop amounts for respective inverter temperatures.

5. The system of claim 4, wherein when the temperature of the inverter increases toward the overheating reference temperature, the control part detects an evaporator target temperature drop amount corresponding to the temperature of the inverter from the table values of evaporator target temperature drop amounts for respective inverter temperatures, and the control part is configured to calculate a final evaporator target temperature ($T3$) by processing a detected evaporator target temperature drop amount ($T2$) and an evaporator target temperature ($T1$) preset according to temperature conditions inside and outside a passenger room and a user-set temperature by equation (1) below, and change the calculated final evaporator target temperature ($T3$) to the evaporator target temperature:

$$\text{final evaporator target temperature } (T3) = \text{preset evaporator target temperature } (T1) - \text{evaporator target temperature drop amount } (T2) \text{ corresponding to inverter temperature} \quad (1).$$

6. The system of claim 5, wherein the evaporator target temperature drop amounts for respective inverter temperatures stored in the control part increases linearly in proportion to the temperature of the inverter.

7. The system of claim 5, wherein among the evaporator target temperature drop amounts for respective inverter temperatures stored in the control part, the evaporator target temperature drop amount corresponding to the overheating warning temperature or higher and the overheating reference temperature or lower increases linearly in proportion to the temperature of the inverter.

8. The system of claim 7, wherein among the evaporator target temperature drop amounts for respective inverter temperatures stored in the control part, the evaporator target temperature drop amount corresponding to the overheating reference temperature of the inverter or higher is maintained at a constant level, and the control part is configured to change the evaporator target temperature based on the evaporator target temperature drop amount of the constant level when the temperature of the inverter is equal to or higher than the overheating reference temperature.

9. The system of claim 4, wherein the control part is configured to change the evaporator target temperature based on the table values of evaporator target temperature drop amounts for respective inverter temperatures only under a condition in which the temperature of the inverter is equal to or higher than the overheating warning temperature set to be lower than the overheating reference temperature.

10. The system of claim 1, wherein when the temperature of the inverter is equal to or higher than the overheating warning temperature, the control part is configured to increase the rotation speed (RPM) of the electric compressor so that the refrigerant flow rate on the inlet side of the electric compressor increases.

* * * * *